(12) United States Patent
Fujii et al.

(10) Patent No.: US 9,079,155 B2
(45) Date of Patent: Jul. 14, 2015

(54) PHOTOCATALYST COATED BODY AND PHOTOCATALYST COATING LIQUID

(75) Inventors: Hiroyuki Fujii, Kanagawa-ken (JP); Junji Kameshima, Dusseldorf (DE); Koji Omoshiki, Kanagawa-ken (JP); Satoru Kitazaki, Kanagawa-ken (JP); Susumu Adachi, Gifu-ken (JP)

(73) Assignee: Toto Ltd., Fukuoka (JP)

( * ) Notice: Subject to any disclaimer, the term of this patent is extended or adjusted under 35 U.S.C. 154(b) by 251 days.

(21) Appl. No.: 13/813,013

(22) PCT Filed: Jul. 26, 2011

(86) PCT No.: PCT/JP2011/066933
§ 371 (c)(1),
(2), (4) Date: Mar. 5, 2013

(87) PCT Pub. No.: WO2012/014877
PCT Pub. Date: Feb. 2, 2012

(65) Prior Publication Data
US 2013/0224096 A1 Aug. 29, 2013

(30) Foreign Application Priority Data

Jul. 29, 2010 (JP) ................................. 2010-170065
Mar. 23, 2011 (JP) ................................. 2011-063906
May 12, 2011 (JP) ................................. 2011-107363

(51) Int. Cl.
| | |
|---|---|
| B01J 21/08 | (2006.01) |
| B01J 21/06 | (2006.01) |
| B01J 35/00 | (2006.01) |
| B01J 37/00 | (2006.01) |
| B01J 37/02 | (2006.01) |
| B01J 37/03 | (2006.01) |
| C09D 1/00 | (2006.01) |
| C09D 5/16 | (2006.01) |
| B01D 53/00 | (2006.01) |
| B01D 53/88 | (2006.01) |

(52) U.S. Cl.
CPC ............... *B01J 21/08* (2013.01); *B01D 53/00* (2013.01); *B01D 53/88* (2013.01); *B01J 21/063* (2013.01); *B01J 21/066* (2013.01); *B01J 35/004* (2013.01); *B01J 35/006* (2013.01); *B01J 37/0045* (2013.01); *B01J 37/0215* (2013.01); *B01J 37/038* (2013.01); *C09D 1/00* (2013.01); *C09D 5/1687* (2013.01); *B01D 2255/20715* (2013.01); *B01D 2255/30* (2013.01); *B01D 2255/802* (2013.01)

(58) Field of Classification Search
CPC ........ B01J 21/08; B01J 21/066; B01J 21/063; B01J 35/006; B01J 35/004; B01J 37/0045; B01J 37/038; B01J 37/0215; B01D 53/88; B01D 53/00; B01D 2255/30; B01D 2255/20715; C09D 5/1687; C09D 1/00

USPC ................ 502/150, 242, 350; 423/239.1; 106/286.4, 287.34
See application file for complete search history.

(56) References Cited

U.S. PATENT DOCUMENTS

| | | | |
|---|---|---|---|
| 6,228,480 B1 | 5/2001 | Kimura et al. | |
| 6,337,301 B1 | 1/2002 | Ohmori et al. | |
| 6,407,033 B1 | 6/2002 | Kimura et al. | |
| 6,498,000 B2 | 12/2002 | Murasawa et al. | |
| 6,582,839 B1 | 6/2003 | Yamamoto et al. | |
| 7,572,431 B2 * | 8/2009 | Seal et al. | ............ 423/608 |
| 7,977,270 B2 | 7/2011 | Kitazaki et al. | |
| 2008/0026161 A1 * | 1/2008 | Frings et al. | ............ 427/559 |
| 2009/0286673 A1 | 11/2009 | Omoshiki et al. | |
| 2010/0147192 A1 * | 6/2010 | Huang | ............ 106/287.14 |
| 2011/0236284 A1 * | 9/2011 | Hayakawa et al. | ......... 423/239.1 |

FOREIGN PATENT DOCUMENTS

| | | |
|---|---|---|
| JP | 1-218622 A | 8/1989 |
| JP | 7-171408 A | 7/1995 |
| JP | 9-227156 A | 9/1997 |
| JP | 11-290692 A | 10/1999 |
| JP | 2000-136370 A | 5/2000 |
| JP | 2001-070801 A | 3/2001 |
| JP | 2001-162176 A | 6/2001 |
| JP | 2001-286766 A | 10/2001 |
| JP | 2002-226734 A | 8/2002 |
| JP | 2005-161204 A | 6/2005 |
| JP | 2008-264747 A | 11/2008 |
| JP | 2008-272718 A | 11/2008 |
| JP | 2009-039687 A | 2/2009 |
| JP | 2009-270040 A | 11/2009 |
| WO | 97/00134 A1 | 1/1997 |
| WO | 98/15600 A1 | 4/1998 |
| WO | 99/28393 A1 | 6/1999 |
| WO | 2008/081589 A1 | 7/2008 |

* cited by examiner

*Primary Examiner* — Anthony J Zimmer
(74) *Attorney, Agent, or Firm* — Carrier Blackman & Associates, P.C.; Joseph P. Carrier; William D. Blackman

(57) ABSTRACT

A photocatalyst coated body includes a base and a photocatalyst layer provided on the base. The photocatalyst coated body is characterized in that photocatalyst layer contains 1-20 (inclusive) parts by mass of photocatalyst particles, 30-98 (inclusive) parts by mass of silica particles and 1-50 (inclusive) parts by mass of zirconia particles, so that the total all of these particles is 100 parts by mass. The photocatalyst coated body is also characterized in that the zirconia particles are at least one kind of particles selected from the group consisting of crystalline zirconia particles having an average crystallite diameter of 10 nm or less and amorphous zirconia particles. Such photocatalyst coated body has excellent photocatalytic degradation function and excellent weather resistance; and also it is capable of suppressing the formation of intermediate products such as $NO_2$, while increasing the amount of $NO_x$ removed during removal of $NO_x$ in the air.

27 Claims, No Drawings

PHOTOCATALYST COATED BODY AND PHOTOCATALYST COATING LIQUID

RELATED APPLICATION

This application is based upon and claims the benefit of priority from the prior Japanese Patent Application No. 170065/2010 filed on Jul. 29, 2010, the prior Japanese Patent Application No. 063906/2011 filed on Mar. 23, 2011, and the prior Japanese Patent Application No. 107363/2011 filed on May 12, 2011, the entire contents of which are incorporated herein by reference.

TECHNICAL FIELD

The present invention relates to a photocatalyst-coated body and a photocatalytic coating liquid for photocatalyst-coated body formation.

BACKGROUND ART

Photocatalysts such as titanium oxide have recently become extensively utilized. Activity excited by photoenergy of photocatalysts can be utilized to decompose various harmful substances or to hydrophilify a surface of a member with a photocatalyst particle-containing surface layer formed thereon, whereby fouling deposited on the surface by water can easily be washed away.

A method in which the layer is formed utilizing a binder component having corrosion resistance to a photocatalyst and is brought into close contact with a surface of a substrate, is known as a method for the formation of a photocatalyst particle-containing layer on a surface of a substrate (for example, JP H07(1995)-171408A (PTL 1)).

Various types of binders have been proposed in these methods. Examples thereof include fluororesins (for example, JP H07(1995)-171408A (PTL 1)), silicones (for example, JP 2005-161204A (PTL 2)), silica particles (for example, JP 2008-264747A (PTL 3)), zirconium compounds (for example, WO 99/28393 (PTL 4)), aluminum compounds (for example, JP 2009-39687A (PTL 5)).

In the construction of the photocatalyst layer formed on a surface of a substrate, when the substrate is an organic material, there is a possibility that the organic material is decomposed or deteriorated by photocatalytic activity of the photocatalyst. To cope with this problem, a technique is known in which an adhesive layer such as a silicone-modified resin is provided between the photocatalyst layer and the substrate to protect the substrate as the substrate from a deterioration caused by photocatalytic action (WO 97/00134 (PTL 6)). In this prior art, an example in which the amount of the photocatalyst exceeds 20% by weight was disclosed. Further, it is described that the decomposition or deterioration of the substrate could be effectively prevented.

A proposal has also been made in which an intermediate layer comprising a silicone-modified resin and an organic antimold agent is provided between a photocatalyst layer and a substrate to prevent the decomposition and deterioration of the substrate (JP 2008-272718A (PTL 7)).

Various proposals on a technique in which $NO_x$ is decomposed utilizing photocatalysts have been made (for example, JP H01(1998)-218622A (PTL 8), JP 2001-162176A (PTL 9), JP 2008-264747A (PTL 3))

What is important of $NO_x$ decomposition is to efficiently decompose $NO_x$ and, at the same time, to suppress the production of harmful intermediate products such as $NO_2$. In decomposing $NO_x$ by photocatalysts, the development of a technique that can suppress the production of harmful intermediate products is desired.

JP 2009-270040A (PTL 11) is a prior art which discloses a combination of photocatalyst with zirconium compounds. PTL 11 discloses a photocatalyst coating liquid comprising photocatalytic titanium oxide, zirconia particles where D50 is 1 to 20 nm, and carboxylic acid. The zirconia particles are included in order to enhance adhesion of photocatalyst layer. When titanium oxide is 100 parts by mass, zirconia particles are not less than 25 parts by mass and not more than 100 parts by mass. However, the patent publication does not disclose addition of silica particles. The patent publication discloses evaluation of aldehyde decomposition capability, but does not disclose $NO_x$ decomposition capability and weather resistance.

WO 97/00134 (PTL 6) discloses a photocatalyst layer comprising titanium oxide, silica and zirconium oxide sol. (for example, Example 27) PTL 6 disclose discloses zirconium tetrabutoxide as a zirconium oxide sol, which is dried by heating. The diameter of the zirconia particles after dried by heating under the conditions disclosed in PTL 6 is considered to be several μm.

Further, JP 2009-39687A (PTL 5) discloses a photocatalyst-coated body comprising photocatalyst particles, silica and zirconium acetate. In PTL 5, the compositions including zirconium acetate are cured at room temperature. Accordingly, it is considered that zirconium compounds that are produced after the cure are not in the form of particles. PTL 5 also discloses evaluation of aldehyde decomposition capability of the photocatalyst-coated body, but does not disclose $NO_x$ decomposition capability and weather resistance. Furthermore, in PTL 5, the addition amount of silica is less than 30 parts by mass.

WO 98/015600[PTL 12] discloses a photocatalyst layer comprising photocatalysts, zirconium compounds and/or tin compounds, silica compounds. According to PTL 12, the zirconia compounds are included from the viewpoint of imparting alkaline resistance. According to PTL 12, the zirconium tetrabutoxide as a zirconium oxide sol is dried by heating in order to obtain zirconium compounds. Accordingly, it is considered that monoclinic zirconia is produced under the conditions according to PTL 12 and that the particle diameter thereof is several μm.

CITATION LIST

Patent Literature

[PTL 1] JP H07(1995)-171408A
[PTL 2] JP 2005-161204A
[PTL 3] JP 2008-264747A
[PTL 4] WO 99/28393
[PTL 5] JP 2009-39687A
[PTL 6] WO 97/00134
[PTL 7] JP 2008-272718A
[PTL 8] JP H01(1989)-218622A
[PTL 9] JP 2001-162176A
[PTL 10] JP H09(1997)-227156A
[PTL 11] JP 2009-270040A
[PTL 12] WO 98/015600

SUMMARY OF INVENTION

The present inventors have now found that the construction of a photocatalyst layer comprising photocatalyst particles and silica particles in a specific proportion, and further comprising at least one kind of particles selected from the group consisting of crystalline zirconia particles that have an average crystallite diameter of 10 nm or less and amorphous zirconia particles, more preferably amorphous zirconia particles, can realize various excellent properties, in particular, good photocatalytic degradation function and remarkably effective prevention of deterioration of the substrate. It has also been found that the photocatalyst layer is advantageous in that in removing $NO_x$ in the air, the production of intermediate products such as $NO_2$ can be suppressed while enhancing the amount of $NO_x$ removed.

According to the present invention, there is provided a photocatalyst-coated body that can realize various excellent properties, in particular, good photocatalytic degradation function and good weather resistance and to provide a photocatalytic coating liquid for use in photocatalyst-coated body formation.

According to the present invention, there is provided a photocatalyst-coated body that in removing $NO_x$ in the air, can suppress the production of intermediate products such as $NO_2$ while enhancing the amount of $NO_x$ removed and to provide a photocatalytic coating liquid for use in photocatalyst-coated body formation.

The photocatalyst-coated body according to the present invention comprises a substrate and a photocatalyst layer provided on the substrate,
the photocatalyst layer comprising:
photocatalyst particles being not less than 1 parts by mass and not more than 20 parts by mass,
silica particles being not less than 30 parts by mass and not more than 98 parts by mass, and
zirconia particles being not less than 1 parts by mass and not more than 50 parts by mass,
wherein the total content of the photocatalyst particles, the silica particles and the zirconia particles is 100 parts by mass,
wherein the zirconia particles are at least one kind of particles selected from the group consisting of crystalline zirconia particles that have an average crystallite diameter of 10 nm or less and amorphous zirconia particles.

The photocatalyst coating liquid according to the present invention comprises:
photocatalyst particles not less than 1 parts by mass and not more than 20 parts by mass,
silica particles not less than 30 parts by mass and not more than 98 parts by mass, and
zirconia particles not less than 1 parts by mass and not more than 50 parts by mass,
wherein the total content of the photocatalyst particles, the silica particles, and the zirconia particles is 100 parts by dry mass,
wherein the photocatalyst coating liquid further comprises water and/or alcohol,
wherein the zirconia particles are at least one kind of particles selected from the group consisting of crystalline zirconia particles that have an average crystallite diameter of 10 nm or less and amorphous zirconia particles.

The photocatalyst-coated body according to the present invention can realize various excellent properties, in particular, good photocatalytic degradation function and good weather resistance. In particular, when the substrate is an organic substrate, deterioration of the substrate that is caused by the photocatalyst is remarkably suppressed and thereby weather resistance is improved. The photocatalyst-coated body according to the present invention is capable of suppressing the formation of intermediate products such as $NO_2$, while increasing the amount of $NO_x$ removed during removal of $NO_x$ in the air. In addition, according to preferred embodiments of the present invention, the photocatalyst-coated body also having excellent hydrophilicity and various excellent intended coat properties (transparency, film strength, and so on) can be provided.

DESCRIPTION OF EMBODIMENTS

Photocatalyst-Coated Body

The photocatalyst-coated body according to the present invention comprises a substrate and a photocatalyst layer provided on the substrate,
the photocatalyst layer comprising:
photocatalyst particles being not less than 1 parts by mass and not more than 20 parts by mass,
silica particles being not less than 30 parts by mass and not more than 98 parts by mass, and
zirconia particles being not less than 1 parts by mass and not more than 50 parts by mass,
wherein the total content of the photocatalyst particles, the silica particles and the zirconia particles is 100 parts by mass,
wherein the zirconia particles are at least one kind of particles selected from the group consisting of crystalline zirconia particles that have an average crystallite diameter of 10 nm or less and amorphous zirconia particles.

Substrate

In the present invention, various materials regardless of inorganic or organic materials may be used in the substrate in the present invention as long as a photocatalyst layer can be formed on the material. Further, the shape of the substrate is not also limited. Examples of preferred substrates from the viewpoint of material include metals, ceramics, glass, plastics, rubbers, stones, cement, concrete, fibers, woven fabrics, wood, paper, combinations thereof, laminates thereof, and materials formed of the above materials with a film of at least one layer provided thereon. Examples of preferred substrates from the viewpoint of applications include building materials, exterior of buildings, window frames, window glass, structural members, exterior and coating of vehicles, exterior of mechanical devices or articles, dust covers and coating, traffic signs, various display devices, advertising pillars, sound insulation walls for roads, insulation walls for railways, bridges, exterior and coating of guard rails, interior and coating of tunnels, insulators, solar battery covers, heat collection covers for solar water heaters, PVC greenhouses, covers for vehicle illuminating lamps, outdoor lighting equipment, tables, and exterior materials for application onto the surface of the above articles, for example, films, sheets, and seals.

Advantages in the present invention can be advantageously exerted in substrates having a surface containing an organic material. Examples of such substrates include organic material-containing resins, coated bodies having a surface with an organic material-containing resin applied thereon, and laminates having a surface with a film or the like containing an organic material-containing resin stacked thereon. Substrates applicable from the viewpoint of applications include metal laminated sheets or plates such as metal coated sheets or plates, and vinyl chloride steel sheets or plates, ceramic decorative sheets or plates, and building materials such as resin building materials, exterior of buildings, interior of buildings, window frames, window glass, structural members, exterior and coating of vehicles, exterior of mechanical devices and articles, dust covers and coating, traffic signs, various display devices, advertising pillars, sound insulation walls for roads, insulation walls for railways, bridges, exterior and coating of guard rails, interior and coating of tunnels, insulators, solar battery covers, heat collection covers for solar water heaters, PVC greenhouses, covers for vehicle illuminating lamps, housing equipment, stools, bath tubs, washstands, lighting equipment, illumination lamp covers, kitchenwares, tablewares, dish washers, dish driers, sinks, range cooks, kitchen hoods, and ventilating fans. In particular, in the present invention, the utilization of metal-coated sheets or plates or metal laminated sheets or plates as the substrate is preferred from the viewpoint of low susceptibility to deterioration/corrosion.

In conventional photocatalyst-coated bodies, in order to suppress the influence of the photocatalytic activity of the photocatalyst layer on the substrate, it is common practice to provide a layer of a silicone resin between the photocatalyst layer and the substrate. According to the present invention, instead of the silicone resin commonly provided in the prior art, the photocatalyst layer can also be provided directly on a substrate formed of an organic material. As a result, the present invention is very advantageous in that the range of utilization and application can be greatly extended.

Photocatalyst Layer of Photocatalyst-Coated Body

In the present invention, the photocatalyst layer includes a complete film form or, for example, a partially film form, as long as photocatalytic titanium oxide particles are present on the surface of the substrate. Further, the photocatalyst layer may be present in an island-like discrete form. In a preferred embodiment of the present invention, the photocatalyst layer is formed by applying a coating liquid.

The photocatalyst layer of photocatalyst-coated body according to the present invention comprises:

photocatalyst particles being not less than 1 parts by mass and not more than 20 parts by mass, silica particles being not less than 30 parts by mass and not more than 98 parts by mass, and zirconia particles being not less than 1 parts by mass and not more than 50 parts by mass, wherein the total content of the photocatalyst particles, the silica particles and the zirconia particles is 100 parts by mass, wherein the zirconia particles are at least one kind of particles selected from the group consisting of crystalline zirconia particles that have an average crystallite diameter of 10 nm or less and amorphous zirconia particles.

(a) Zirconia Particle

In the present invention, the zirconia particles that constitute the photocatalyst layer can be in the form of crystalline structure, amorphous structure or a mixture thereof. When the zirconia particles are in the form of crystalline structure, the zirconia particles with an average crystallite diameter of 10 nm or less are used.

Totally unexpected results were obtained that use of amorphous zirconia particles enhanced weather resistance specifically according to examples described below although the cause of the effect is unknown. Accordingly, use of amorphous zirconia particles as zirconia particles is preferable. Suitable crystal forms of crystalline zirconia particles include a monoclinic form, a tetragonal crystal form, a cubic crystal form, a rhombohedral crystal form. Preferred is the monoclinic form. The monoclinic zirconia particles, which constitute a stable phase at ambient temperature, can be maintained in a chemically stable state without adding any stabilizing agents. Accordingly, the monoclinic zirconia particles are advantageous in that the influence by the stabilizing agents is reduced.

In the present invention, the content of the zirconia particles in the photocatalyst layer is not less than 1 parts by mass and not more than 50 parts by mass. It is preferable that the lower limit of the content is not less than 5 parts by mass and the upper limit of the content is not more than 45 parts by mass. From another point of view, the content is preferably not less than 5 parts by mass and less than 50 parts by mass and more preferably not less than 5 parts by mass and not more than 45 parts by mass. The content of zirconia particle within the abovementioned range makes it possible that the photocatalyst layer maintains good weather resistance and good $NO_x$ decomposition capability.

The average crystallite diameter of crystalline zirconia particles is 10 nm or less, preferably 8 nm or less wherein the average crystallite diameter means an average crystallite diameter that is determined according to the Scherrer's equation based on a diffractometry peak having the highest intensity around $2\theta=25°$ to $32°$ following pattern fitting processing which removes background in X-ray diffractometry.

In the present invention, amorphous zirconia particles means zirconia particles wherein a diffractometry peak having the highest intensity around $2\theta=25°$ to $32°$ following pattern fitting processing which removes background in X-ray diffractometry is not clearly observed.

In one embodiment of the present invention, it is preferable that the zirconia particles have an average particle diameter more than 5 nm and not more than 50 nm. The more preferable lower limit thereof is 10 nm and further the more preferable lower limit is 20 nm. The preferable upper limit is 40 nm and the further more preferable upper limit is 30 nm. From another viewpoint, it is preferable that the zirconia particles have an average particle diameter more than 10 nm and not more than 40 nm. It is more preferable that the zirconia particles have an average particle diameter not less than 10 nm and not more than 30 nm. The average particle diameter is calculated as a number average value determined by measuring the length of 100 randomly selected particles in a visual field at a magnification of 200,000 times under a scanning electron microscope. The shape of the particles is most preferably spherical and may also be substantially circular or elliptical. In this case, the length of the particles is approximately calculated as ((major axis+minor axis)/2). When the particle diameters are in this range, the abrasion resistance of the photocatalyst layer is improved. The particles having particle diameters in this range is likely to form the proper porosity of the photocatalyst layer so that photocatalytic degradation function is enhanced.

(b) Photocatalyst Particle

In the present invention, the content of the photocatalyst particles in the photocatalyst layer is not less than 1 parts by mass and not more than 20 parts by mass and preferably not less than 1 parts by mass and not more than 15 parts by mass and more preferably not less than 1 parts by mass and not more than 10 parts by mass.

The photocatalyst particles used in the present invention are not particularly limited as long as the photocatalyst particles are particles having photocatalytic activity. Preferred examples thereof include particles of titanium oxide such as anatase form of titanium oxide, rutile form of titanium oxide, and brookite form of titanium oxide and particles of metal oxides such as zinc oxide, tin oxide, strontium titanate, tungsten oxide. More preferred are particles of titanium oxide. Most preferred are particles of anatase form of titanium oxide.

In a preferred embodiment of the present invention, the photocatalyst particles have an average particle diameter not less than 10 nm and not more than 100 nm. More preferred are particles having an average particle diameter not less than 10 nm and not more than 60 nm. The average particle diameter is calculated as a number average value determined by measuring the length of 100 randomly selected particles in a visual field at a magnification of 200,000 times under a scanning electron microscope. The shape of the particles is most preferably spherical and may also be substantially circular or elliptical. In this case, the length of the particles is approximately calculated as ((major axis+minor axis)/2). When the particle diameters are in this range, the photocatalytic activity is enhanced. The particles having particle diameters in this range is likely to form the proper porosity of the photocatalyst layer so that photocatalytic degradation function is enhanced.

(c) Silica Particle

In the present invention, the content of the silica particles in the photocatalyst layer is not less than 30 parts by mass and not more than 98 parts by mass. It is preferable that the lower limit of the content is 35 parts by mass, more preferably, 40 parts by mass, and most preferably 70 parts by mass. It is preferable that the upper limit of the content is 94 parts by mass. From another point of view, the content is preferably not less than 30% by mass and not more than 94% by mass, more preferably not less than 40% by mass and not more than 94% by mass, and most preferably not less than 70% by mass and not more than 94% by mass. The content of the silica particles within the abovementioned range makes it possible that the photocatalyst layer is able to maintain good weather resistance. The photocatalyst layer also decomposes more amount of $NO_x$ in the air and suppresses the generation of intermediate products such as $NO_2$.

The silica particles used in the present invention, have preferably an average particle diameter more than 5 nm and not more than 50 nm. More preferred is an average diameter more than 10 nm and not more than 40 nm. Further more preferred is an average diameter not less than 10 nm and not more than 30 nm. The average particle diameter is calculated as a number average value determined by measuring the length of 100 randomly selected particles in a visual field at a magnification of 200,000 times under a scanning electron microscope. The shape of the particles is most preferably spherical and may also be substantially circular or elliptical. In this case, the length of the particles is approximately calculated as ((major axis+minor axis)/2). When the particle diameters are in this range, the abrasion resistance of the photocatalyst layer is improved. The particles having particle diameters in this range is likely to form the proper porosity of the photocatalyst layer so that photocatalytic degradation function is enhanced. When the silica particles are sized in this range, the photocatalyst layer also decomposes more amount of $NO_x$ in the air and suppresses the generation of intermediate products such as $NO_2$.

(d) Thickness

In a preferred embodiment of the present invention, the thickness of the photocatalyst layer of the photocatalyst-coated body is preferably not more than 3 µm. With the thickness thereof not more than 3 µm, the photocatalyst layer has excellent properties of transparency and film strength and prevents cracking from extending on the surface thereof, which avoids poor appearance thereof. The thickness of the photocatalyst layer is preferably not less than 0.2 µm, and more preferably not less than 0.5 µm. With the thickness thereof not less than 0.2 µm, good wettability thereof is ensured and the weather resistance thereof is improved because ultraviolet light reaching the interface between the photocatalyst layer and the substrate of the photocatalyst-coated body significantly attenuates. With the thickness thereof in this range, the photocatalyst layer decomposes more amount of $NO_x$ in the air and suppress the generation of intermediate products such as $NO_2$, while transparency of the photocatalyst layer is ensured.

(d) Other Components

Although in the present invention, it is preferable that the photocatalyst layer substantially consists of the photocatalyst particles, the silica particles and the zirconia particles, the existence of other components including particulate components other than the above particles is not excluded.

In one embodiment of the present invention, the content of the particulate components in the photocatalyst layer is not less than 85% by mass and not more than 100% by mass and more preferably, not less than 90% by mass and not more than 100% by mass. The particulate components comprise photocatalyst particles, at least one kind of zirconia particles selected from the group consisting of crystalline zirconia particles that have an average crystallite diameter of 10 nm or less and amorphous zirconia particles, and further particles included in the photocatalyst layer such as silica particles and other inorganic oxide particles.

The inorganic oxide particles to be used in the present invention are not particularly limited, provided that the particles can form a layer together with photocatalyst particles. Particles of single oxides such as alumina, zirconia, ceria, yttria, boronia, magnesia, calcia, ferrite, amorphous form of titania, hafnia and particles of composite oxides such as oxides of barium titanate and calcium silicate can be used.

Further, in a preferred embodiment of the present invention, in order to develop a high level of antimicrobial, antiviral, and antimold properties, at least one metal selected from the group consisting of vanadium, iron, cobalt, nickel, palladium, zinc, ruthenium, rhodium, copper, cuprous oxide, cupric oxide, silver, silver oxide, platinum, and gold and/or at least one metal compound of the metal(s) may be allowed to exist in the photocatalyst layer. Preferably, the presence of the metal and/or the metal compound does not affect the formation of porosity among the photocatalytic titanium oxide particles and the inorganic oxide particles. Accordingly, the addition amount of the metal and/or the metal compound may be very small, and the amount of the metal and/or the metal compound necessary for the development of the action is very small. Specifically, the addition amount is preferably approximately 0.001 to 10% by mass, more preferably 0.05 to 5% by mass, based on the photocatalyst.

In the photocatalyst layer according to the present invention, not less than 0% by mass and not more than 15% by mass, more preferably, not less than 0% by mass and not more than 10% by mass of a binder may further be contained as an optional component. At least one material selected, for example, from the group consisting of silicone emulsions, modified silicone emulsions, fluororesin emulsions, silicone resins, modified silicone resins, hydrolyzates/condensates of alkyl silicates, alkali silicates, basic and water soluble zirconium compounds, and hydrolyzates/condensates of metal alkoxides is preferred as the binder.

In the photocatalyst layer according to the present invention, in addition to the photocatalyst particles, the inorganic oxide particles and a binder as an optional component, the ultraviolet shielding agent, the organic antimold agent and the like can be added. Preferably, the ultraviolet shielding agent, the organic antimold agent and the like are not added at all. When the ultraviolet shielding agent, the organic antimold agent and the like are added, the addition amount is not less than 0% by mass and not more than 15% by mass, preferably not less than 0% by mass and not more than 10% by mass, more preferably not less than 0% by mass and not more than 5% by mass when the photocatalyst layer is totally 100% by mass. Preferably, the presence thereof does not affect the formation of porosity among the photocatalytic titanium oxide particles and the inorganic oxide particles In a preferred embodiment of the present invention, the porosity of the photocatalyst layer is 15% by volume or more so that enough porosity is ensured. Accordingly, eluted silicone can permeate through the holes in the photocatalyst layer and harmful gas is easily decomposed by photocatalytic action as the gas contacts more photocatalyst particles in the photocatalyst layer. In a preferred embodiment of the present invention the porosity of the photocatalyst layer is 50% by volume or less so that the abrasion resistance of the photocatalyst layer can be sufficiently secured.

The porosity as used herein is a value obtained by measuring five points or more per sample, preferably 10 points or more per sample, with a reflection spectral film thickness meter, using FE-3000 manufactured by Otsuka Electronics Co., Ltd. and averaging the measured values. The procedure of the measurement of the porosity wherein glass is used as a substrate and the photocatalyst layer comprises $TiO_2$ and $SiO_2$ will be described as follows.

Step 1. Determination of Refractive Index of Glass Plate 1-1. The reflectance of the glass plate at a wavelength of 230 nm to 800 nm is measured under the following conditions.

Measuring method: Absolute reflectance
Lens: Refrec. 25×
Reference reflector plate: Al-S-13
Filter: Not used
Slit: 0.2 mm×2 mm
Sampling time: 1000 msec
Cumulated number: 9
Gain: Normal 1-2. The reflectance of the glass plate at a wavelength range of 230-800 nm is calculated by n-Cauchy dispersion equation and a Fresnel's amplitude reflection coefficient at the interface between air and the glass plate, wherein constituent media are air and the glass plate, a light incident angle φ is 0 degree, and the coefficient is determined by reflected light from the glass plate. In the n-Cauchy dispersion equation, the initial values of constants ($C_{m1}$, $C_{m2}$, and $C_{m3}$) are $C_{m1}=1.5$, $C_{m2}=0$, and $C_{m3}=0$, respectively; the refractive index of air is 1; and the extinction coefficient of air is 0 (zero) (Mitsunobu Kobiyama, "Kogaku Haku Maku no Kiso Riron (Basic Theory of Optical Thin Film)," pp. 1-70 (2003, Optronics Co., Ltd.)).

1-3. The measured reflectance (1-1) was compared with the calculated reflectance (1-2), and $C_{m1}$, $C_{m2}$, and $C_{m3}$ were determined at a minimum sum of square residuals. In this case, the upper limit of the sum of the square residuals is 0.02.

1-4. $C_{m1}$, $C_{m2}$, and $C_{m3}$ determined in 1-3 are introduced into the n-Cauchy dispersion equation to determine the refractive index nm of the glass substrate.

2-1. The reflectance of the photocatalyst layer at a wavelength of 230 nm to 800 nm is measured under the following conditions.

Measuring method: Absolute reflectance
Lens: Refrec. 25×
Reference reflector plate: Al-S-13
Filter: Not used
Slit: 0.2 mm×2 mm
Sampling time: 1000 msec
Cumulated number: 9
Gain: Normal 2-2. The reflectance on the single-layer thin film composed of photocatalyst at a wavelength range of 230-800 nm is calculated by a Fresnel's amplitude reflection coefficient at the interface between air and the single-layer thin film, wherein constituent media are air, a single-layer thin film (the photocatalyst layer), and a glass plate, a light incident angle φ is 0 degree, and the coefficient is determined by a total of reflected light from the single-layer thin film and transmitted light derived from multipath reflection of light between top and bottom of the single-layer thin film, and Bruggeman's approximate equation: $[C_1\{(\in_1-\in)/(\in_1+2\in)\}+C_2\{(\in_2-\in)/(\in_2+2\in)\}+C_3\{(\in_3-\in)/(\in_3+2\in)\}=0$, $C_1+C_2+C_3=1$, ($\in$: dielectric constant of the single-layer thin film, $\in_1$ dielectric constant of $SiO_2$, $\in_2$: dielectric constant of $TiO_2$, $\in_3$: dielectric constant of air, $C_1$: volume fraction of $SiO_2$, $C_2$: volume fraction of $TiO_2$, $C_3$: volume fraction of air)] (Mitsunobu Kobiyama, "Kogaku Haku Maku no Kiso Riron (Basic Theory of Optical Thin Film)," pp. 1-70 (2003, Optronics Co., Ltd.), and D. E. Aspnes, Thin Solid Films, 89, 249 (1982)) The initial values of $C_1$ (volume fraction of SiO2), $C_2$ (volume fraction of TiO2), and $C_3$ (volume fraction of air) are determined at a minimum sum of square residuals. The refractive index of air is 1, and the extinction coefficient of air is 0 (zero). The refractive index (n1, n2) and extinction coefficient (k1, k2) of SiO2 and TiO2 are extracted from E. D. Palik, "Handbook of Optical Constants of Solids", (1998, Academic Press, San Diego).

2-3. The film thickness d and the volume fractions, $C_1$ of $SiO_2$, $C_2$ of $TiO_2$, and $C_3$ of air are varied, and the measured reflectance (2-1) is compared with the calculated reflectance (2-2), and $C_1$, $C_2$, and $C_3$ are determined at a minimum sum of square residuals. $C_3$ is adopted as the porosity when the sum of square residuals is less than 0.02 and is minimum. Other conditions are as follows.

Film thickness search method: Optimization method
Search range (wavelength): 400 to 800 nm
Search range (film thickness): 0 to 2000 nm
Film thickness step: 10 nm The $C_3$ value determined here is regarded as the porosity of the photocatalyst layer according to the present invention.

Photocatalyst Coating Liquid

The photocatalyst coating liquid according to the present invention comprises:

photocatalyst particles not less than 1 parts by mass and not more than 20 parts by mass, silica particles not less than 30 parts by mass and not more than 98 parts by mass, and zirconia particles not less than 1 parts by mass and not more than 50 parts by mass, wherein the total content of the photocatalyst particles, the silica particles, and the zirconia particles is 100 parts by dry mass, wherein the photocatalyst coating liquid further comprises water and/or alcohol, wherein the zirconia particles are at least one kind of particles selected from the group consisting of crystalline zirconia particles that have an average crystallite diameter of 10 nm or less and amorphous zirconia particles.

The photocatalyst coating liquid according to the preset invention is produced by dispersing or dissolving each component of the photocatalyst layer according to the mass ratio of the components in the above description, which also includes the preferable mass ratio, in water and/or alcohol. The photocatalytic particles, the crystalline zirconia particles and amorphous zirconia particles, and the optional component contained in the coating liquid according to the present invention may be substantially the same as the components constituting the coated body, except that the above components constitutes a liquid composition. Furthermore, the components which are exemplified as preferred embodiments above can be added as preferred into the coating composition according to the present invention.

In the photocatalyst coating liquid according to the present invention, titanium oxide can be in any form such as a powder, a sol, or a solution. The silica particles are preferably in the form of an aqueous colloid in water as a dispersing medium, or in the form of an organosol wherein the silica particles are dispersed as the colloidal form into a hydrophilic solvent such as ethyl alcohol, isopropyl alcohol, or ethylene glycol, though colloidal silica is particularly preferable. The zirconia particles are preferably in the form of an aqueous colloid in water as a dispersing medium, or in the form of an organosol wherein the silica particles are dispersed as the colloidal form into a hydrophilic solvent such as ethyl alcohol, isopropyl alcohol, or ethylene glycol, though sol wherein crystalline zirconia particles having an average crystallite diameter of 10 nm or less and amorphous zirconia particles are dispersed is particularly preferable.

The photocatalytic coating liquid according to the present invention may further comprise a surfactant as an optional component. Although the addition amount thereof can be properly determined, the addition amount thereof is commonly not less than 0 part by mass and less than 10 parts by mass, preferably not less than 0 part by mass and not more than 8 parts by mass, more preferably not less than 0 part by mass and not more than 6 parts by mass. The addition of the surfactant can realize leveling, that is, a smooth and even coating surface. The surfactant is a component that is effective in improving the wettability of the photocatalytic coating liquid. When the wettability is not important, in some cases, preferably, the surfactant is not substantially contained or is not contained at all.

The surfactant may be properly selected by taking into consideration the dispersion stability of the photocatalyst and the inorganic oxide particles and the wetting capability when the coating liquid is coated on the intermediate layer. However, the surfactant is preferably a nonionic surfactant. More preferred are ether-type nonionic surfactants, ester-type nonionic surfactants, polyalkylene glycol nonionic surfactants, fluoro nonionic surfactants, and silicone nonionic surfactants.

The solid content of the photocatalytic coating liquid according to the present invention is not particularly limited. However, the solid content of the photocatalytic coating liquid is preferably 1 to 10% by mass from the viewpoint of easiness of coating. The components constituting the photocatalytic coating composition can be evaluated by separating the coating liquid by ultrafiltration into a particulate component and a filtrate, analyzing the particulate component and the filtrate, for example, by infrared spectroscopy, gel permeation chromatography, or X-ray fluorescence spectroscopy, and analyzing the spectra.

Process for Producing Photocatalyst-Coated Body

The photocatalyst-coated body according to the present invention can be produced by coating the photocatalytic coating liquid according to the present invention on an optionally heated substrate. Coating methods usable herein include commonly extensively used methods, for example, brush coating, roller coating, spray coating, roll coater coating, flow coater coating, dip coating, flow coating, and screen printing. After coating of the coating liquid onto the substrate, the coated substrate may be dried at ambient temperature, or alternatively may if necessary be heat dried. Since, however, there is a possibility that, when the coating is heated to such an extent that sintering proceeds, the porosity among the particles is reduced and, consequently, satisfactory photocatalytic activity cannot be provided, it is preferred to select heating temperature and heating time that do not affect the formation of the porosity at all or do not significantly affect the formation of the porosity. For example, the drying temperature is 5° C. or above and 500° C. or below. When a resin is contained in at least a part of the substrate, the drying temperature is preferably, for example, 10° C. or above and 200° C. or below when the heat resistant temperature of the resin and the like are taken into consideration.

The photocatalyst-coated body according to the present invention is advantageous in that time and cost for production thereof can be reduced since it is not necessary to provide an intermediate layer between a substrate and the photocatalyst layer as described in the above.

EXAMPLE

The present invention is further illustrated by the following examples that are not intended as a limitation of the invention.

Example A1

A flat plate-shaped colored organic material-coated body having a size of 50 mm×100 mm was first provided as a substrate. The colored organic material-coated body is one obtained by coating a red acrylic coating material onto a ceramic siding substrate subjected to sealer treatment and satisfactorily drying and curing the coating.

A photocatalytic coating liquid was then provided. The photocatalytic coating liquid was prepared by mixing an aqueous dispersion of anatase form of titania (average particle diameter: 40 nm), water dispersible colloidal silica (average particle diameter: 20 nm), and an aqueous dispersion of amorphous zirconia particles (average particle diameter: 20 nm) into water as a solvent and adjusting the solid content to 5.5% by mass. The mass ratio among the solid content of $TiO_2$, the solid content of colloidal silica, and the solid content of amorphous zirconia particles was 2:93:5.

The photocatalytic coating liquid thus obtained was spray-coated on the plate-shaped colored organic material-coated body, and the coating was dried at ambient temperature to obtain a photocatalyst-coated body. The thickness of the photocatalyst layer was 0.5 μm.

Example A2

A sample was prepared in the same manner as in Example A1, except that the mass ratio among the solid content of $TiO_2$, the solid content of colloidal silica and the solid content of amorphous zirconia particles in the photocatalytic coating liquid was 2:88:10.

Example A3

A sample was prepared in the same manner as in Example A1, except that the mass ratio among the solid content of $TiO_2$, the solid content of colloidal silica and the solid content of amorphous zirconia particles in the photocatalytic coating liquid was 3.5:91.5:5.

Example A4

A sample was prepared in the same manner as in Example A1, except that the mass ratio among the solid content of $TiO_2$, the solid content of colloidal silica and the solid content of amorphous zirconia particles in the photocatalytic coating liquid was 3.5:86.5:10.

Example A5

A sample was prepared in the same manner as in Example A1, except that the mass ratio among the solid content of TiO$_2$, the solid content of colloidal silica and the solid content of amorphous zirconia particles in the photocatalytic coating liquid was 3.5:94.5:2.

Example A6

A sample was prepared in the same manner as in Example A1, except that the mass ratio among the solid content of TiO$_2$, the solid content of colloidal silica and the solid content of amorphous zirconia particles in the photocatalytic coating liquid was 3.5:92.5:4.

Example A7

A sample was prepared in the same manner as in Example A1, except that the mass ratio among the solid content of TiO$_2$, the solid content of colloidal silica and the solid content of amorphous zirconia particles in the photocatalytic coating liquid was 5:90:5.

Example A8

A sample was prepared in the same manner as in Example A1, except that the mass ratio among the solid content of TiO$_2$, the solid content of colloidal silica and the solid content of amorphous zirconia particles in the photocatalytic coating liquid was 5:85:10.

Example A9

A sample was prepared in the same manner as in Example A1, except that the mass ratio among the solid content of TiO$_2$, the solid content of colloidal silica and the solid content of amorphous zirconia particles in the photocatalytic coating liquid was 10:80:10.

Example A10

A sample was prepared in the same manner as in Example A1, except that the mass ratio among the solid content of TiO$_2$, the solid content of colloidal silica and the solid content of amorphous zirconia particles in the photocatalytic coating liquid was 10:70:20.

Example A11

A sample was prepared in the same manner as in Example A1, except that an aqueous dispersion of monoclinic zirconia particles (average crystallite diameter: 5 nm) instead of an aqueous dispersion of amorphous zirconia particles (average particle diameter: 20 nm) is used and the mass ratio among the solid content of TiO$_2$, the solid content of colloidal silica and the solid content of zirconia particles in the photocatalytic coating liquid was 3.5:94.5:2.

Example A12

A sample was prepared in the same manner as in Example A1, except that an aqueous dispersion of monoclinic zirconia particles (average crystallite diameter: 5 nm) instead of an aqueous dispersion of amorphous zirconia particles (average particle diameter: 20 nm) is used and the mass ratio among the solid content of TiO$_2$, the solid content of colloidal silica and the solid content of zirconia particles in the photocatalytic coating liquid was 3.5:92.5:4.

Example A13

A sample was prepared in the same manner as in Example A6, except that the colored organic material-coated body is one obtained by coating a red acrylic coating material onto an aluminum substrate and satisfactorily drying and curing the coating.

Example A14

A sample was prepared in the same manner as in Example A1, except that the mass ratio among the solid content of TiO$_2$, the solid content of colloidal silica and the solid content of amorphous zirconia particles in the photocatalytic coating liquid was 10:85:5.

Example A15

A flat plate-shaped colored organic material-coated body having a size of 50 mm×100 mm was first provided as a substrate. The colored organic material-coated body is one obtained by coating a acrylic silicone emulsions onto a ceramic siding substrate subjected to sealer treatment and satisfactorily drying and curing the coating.

A photocatalytic coating liquid was then provided. The photocatalytic coating liquid was prepared by mixing an aqueous dispersion of anatase form of titania (average particle diameter: 40 nm), water dispersible colloidal silica (average particle diameter: 20 nm), and an aqueous dispersion of amorphous zirconia particles (average particle diameter: 20 nm) into water as a solvent and adjusting the solid content to 5.5% by mass. The mass ratio among the solid content of TiO$_2$, the solid content of colloidal silica, and the solid content of amorphous zirconia particles was 10:70:20.

The photocatalytic coating liquid thus obtained was spray-coated on the plate-shaped colored organic material-coated body, and the coating was dried at ambient temperature to obtain a photocatalyst-coated body. The thickness of the photocatalyst layer was 0.5 μm.

Example A16

A sample was prepared in the same manner as in Example A15, except that the mass ratio among the solid content of TiO$_2$, the solid content of colloidal silica and the solid content of amorphous zirconia particles in the photocatalytic coating liquid was 10:45:45.

Comparative Example A1

A sample was prepared in the same manner as in Example A1, except that the mass ratio among the solid content of TiO$_2$, the solid content of colloidal silica and the solid content of zirconia particles in the photocatalytic coating liquid was 2:98:0.

Comparative Example A2

A sample was prepared in the same manner as in Example A1, except that the mass ratio among the solid content of TiO$_2$, the solid content of colloidal silica and the solid content of zirconia particles in the photocatalytic coating liquid was 3.5:96.5:0.

Comparative Example A3

A sample was prepared in the same manner as in Example A1, except that the mass ratio among the solid content of TiO$_2$, the solid content of colloidal silica and the solid content of zirconia particles in the photocatalytic coating liquid was 5:95:0.

Comparative Example A4

A sample was prepared in the same manner as in Example A1, except that the mass ratio among the solid content of $TiO_2$, the solid content of colloidal silica and the solid content of zirconia particles in the photocatalytic coating liquid was 10:90:0.

Comparative Example A5

A sample was prepared in the same manner as in Example A1, except that an aqueous dispersion of monoclinic zirconia particles (average crystallite diameter: 15 nm) instead of an aqueous dispersion of amorphous zirconia particles (average particle diameter: 20 nm) is used and the mass ratio among the solid content of $TiO_2$, the solid content of colloidal silica and the solid content of zirconia particles in the photocatalytic coating liquid was 3.5:92.5:4.

Comparative Example A6

A sample was prepared in the same manner as in Example A15, except that the mass ratio among the solid content of $TiO_2$, the solid content of colloidal silica and the solid content of zirconia particles in the photocatalytic coating liquid was 10:90:0.

For each sample thus obtained, the following evaluation tests were carried out.

Evaluation Experiment A1: Long Term Weather Resistance Test Using a Sunshine Weather Meter The photocatalyst-coated body was introduced into a sunshine weather meter (S-300C, manufactured by Suga Test Instruments Co., Ltd.) specified in JIS B 7753. After the elapse of predetermined time, the test specimens were taken out. Before and after the acceleration test, color differences ΔE and ΔL were measured with a colorimetric meter ZE 2000 manufactured by Nippon Denshoku Co., Ltd.

The substrate that is similar to samples of Example A1, but without the photocatalyst layer was introduced into a sunshine weather-o-meter (S-300C, manufactured by Suga Test Instruments Co., Ltd.). After the elapse of predetermined time, the test specimens were taken out. Before and after the acceleration test, color differences ΔE(0) and ΔL(0) were measured with a colorimetric meter ZE 2000 manufactured by Nippon Denshoku Co., Ltd.

Each test specimen was compared by checking ΔE-ΔE(0) or ΔL-ΔL(0)

The results were as shown in Table 1 and Table2.

TABLE 1

| | $TiO_2$ | $SiO_2$ | $ZrO_2$ | $ZrO_2$ type | ΔE-ΔE(0) |
|---|---|---|---|---|---|
| Example A1 | 2 | 93 | 5 | amorphous | 0.3 in 1200 h |
| Example A2 | 2 | 88 | 10 | amorphous | 0.4 in 1200 h |
| Example A3 | 3.5 | 91.5 | 5 | amorphous | 0.7 in 1200 h |
| Example A4 | 3.5 | 86.5 | 10 | amorphous | 0.4 in 1200 h |
| Example A5 | 3.5 | 94.5 | 2 | amorphous | 1.3 in 1200 h |
| Example A6 | 3.5 | 92.5 | 4 | amorphous | 1.7 in 1200 h |
| Example A7 | 5 | 90 | 5 | amorphous | 1.2 in 1200 h |
| Example A8 | 5 | 85 | 10 | amorphous | 1.8 in 1200 h |
| Example A9 | 10 | 80 | 10 | amorphous | 1.8 in 1200 h |
| Example A10 | 10 | 70 | 20 | amorphous | 1.6 in 1200 h |
| Comparative Example A1 | 2 | 98 | 0 | | 3.7 in 800 h |
| Comparative Example A2 | 3.5 | 96.5 | 0 | | 4.1 in 800 h |
| Comparative Example A3 | 5 | 95 | 0 | | 3.7 in 800 h |
| Comparative Example A4 | 10 | 90 | 0 | | 4.0 in 800 h |

TABLE 2

| | $TiO_2$ | $SiO_2$ | $ZrO_2$ | $ZrO_2$ type | ΔL-ΔL(0) |
|---|---|---|---|---|---|
| Example A6 | 3.5 | 92.5 | 4 | amorphous | 0.6 in 1200 h |
| Example A13 | 3.5 | 92.5 | 4 | amorphous | 0.6 in 1200 h |
| Example A11 | 3.5 | 94.5 | 2 | monoclinic | 1.8 in 1200 h |
| Example A12 | 3.5 | 92.5 | 4 | monoclinic | 1.2 in 1200 h |

Evaluation Experiment A2: Outdoor Exposure Test

An outdoor exposure test was carried out at the rooftop of a building in Chigasaki, Kanagawa Prefecture, by placing the test specimens obtained by each of Examples A5 and A6, and Comparative Examples A2 and A5 on the exposure table facing to the south with an inclination angle of 20 degree from a horizontal line, as specified in JIS K 5600-7-6. After three months, the test specimens were taken out and a color difference ΔE was measured with a colorimetric meter ZE 2000 manufactured by Nippon Denshoku Co., Ltd.

The obtained results are shown in Table 3.

TABLE 3

| | $TiO_2$ | $SiO_2$ | $ZrO_2$ | $ZrO_2$ type | ΔE-ΔE(0) |
|---|---|---|---|---|---|
| Example A5 | 3.5 | 94.5 | 2 | amorphous | 2.7 |
| Example A6 | 3.5 | 92.5 | 4 | amorphous | 2.7 |
| Comparative Example A2 | 3.5 | 96.5 | 0 | | 4.1 |
| Comparative Example A5 | 3.5 | 92.5 | 4 | monoclinic | 4.2 |

Evaluation Experiment A3: Decomposition Activity of the Photocatalyst

The methylene blue decomposition capability was evaluated for the samples of Examples A3, A5, A9, A10, A14 and Comparative Examples A2 and A4. The methylene blue decomposition capability test of the photocatalyst was carried out according to JISR1703-2 (Self-cleaning performance test of photocatalyst material-Part 2: Wet decomposition performance) The results of decomposition activity index (MB value) were shown in Table 4.

According to the results as shown in Table 4, MB value of samples with more $ZrO_2$ increased higher when the content of $TiO_2$ was same.

TABLE 4

| | $TiO_2$ | $SiO_2$ | $ZrO_2$ | $ZrO_2$ type | MB value |
|---|---|---|---|---|---|
| Example A3 | 3.5 | 91.5 | 5 | amorphous | 16 |
| Example A5 | 3.5 | 94.5 | 2 | amorphous | 13 |
| Example A9 | 10 | 80 | 10 | amorphous | 18 |
| Example A10 | 10 | 70 | 20 | amorphous | 18 |
| Example A14 | 10 | 85 | 5 | amorphous | 18 |

TABLE 4-continued

|  | TiO$_2$ | SiO$_2$ | ZrO$_2$ | ZrO$_2$ type | MB value |
|---|---|---|---|---|---|
| Comparative Example A2 | 3.5 | 96.5 | 0 |  | 12 |
| Comparative Example A4 | 10 | 90 | 0 |  | 16 |

Evaluation Experiment A4: Outdoor Exposure Test (Miyakojima)

An outdoor exposure test was carried out in Miyakojima Island by placing the samples obtained by each of Examples A15 and A16 and Comparative Example A6 on the exposure table facing to the south with an inclination angle of 20 degree from a horizontal line, as specified in JIS K 5600-7-6. After six months, the test specimens were take out, and an retention ratio of the photocatalyst layer were calculated by observing five visual fields of the surface of the specimens before and after the exposure with under a electron microscope.

The obtained results are shown in Table 5.

TABLE 5

|  | TiO$_2$ | SiO$_2$ | ZrO$_2$ | ZrO$_2$ type | retention ratio |
|---|---|---|---|---|---|
| Example A15 | 10 | 70 | 20 | amorphous | 100 |
| Example A16 | 10 | 45 | 45 | amorphous | 100 |
| Comparative Example A6 | 10 | 90 | 0 |  | 30 |

Example B1

A photocatalytic coating liquid was then provided. The photocatalytic coating liquid was prepared by mixing an aqueous dispersion of anatase form of titania (average particle diameter: 40 nm), water dispersible colloidal silica (average particle diameter: 20 nm), and an aqueous dispersion of zirconia particles (monoclinic crystal and average crystallite diameter 5 nm) into water as a solvent and adjusting the solid content to 5.5% by mass. The mass ratio among the solid content of TiO$_2$, the solid content of colloidal silica, and the solid content of ZrO$_2$ was 10:81:9.

Crystal forms of each component in the photocatalyst coating liquid was confirmed by the results of powder X-ray diffractometry of the product obtained by drying thereof. The number average particle diameter was determined by observing the product obtained by drying thereof under a scanning electron microscope and measuring the length of 100 randomly selected particles in a visual field at a magnification of 200,000 times.

The average crystallite diameter of an aqueous dispersion of zirconia particles was determined according to the Scherrer's equation using a diffractometry peak having the highest intensity around 2θ=28[deg.] by powder X-ray diffractometry of the product obtained by drying thereof, and LaB$_6$ as a reference material.

The photocatalytic coating liquids were coated onto a surface of a substrate, the surface being coated with an acrylic silicone, and the coating was dried at ambient temperature to obtain photocatalyst-coated bodies. The thickness of the photocatalyst layer in the photocatalyst-coated bodies thus obtained was 0.8 μm.

Example B2

A sample was prepared in the same manner as in Example B1, except that the mass ratio among the solid content of TiO$_2$, the solid content of colloidal silica and the solid content of ZrO$_2$ in the photocatalytic coating liquid was 10:72:18. The thickness of the photocatalyst layer in the photocatalyst-coated bodies thus obtained was 0.8 μm.

Example B3

A sample was prepared in the same manner as in Example B1, except that the mass ratio among the solid content of TiO$_2$, the solid content of colloidal silica and the solid content of ZrO$_2$ in the photocatalytic coating liquid was 10:45:45. The thickness of the photocatalyst layer in the photocatalyst-coated bodies thus obtained was 0.8 μm.

Example B4

A sample was prepared in the same manner as in Example B1, except that an aqueous dispersion of amorphous zirconia particles instead of an aqueous dispersion of zirconia particles was used in the photocatalyst coating liquid. The thickness of the photocatalyst layer in the photocatalyst-coated bodies thus obtained was 0.8 μm.

Example B5

A sample was prepared in the same manner as in Example B3, except that an aqueous dispersion of amorphous zirconia particles instead of an aqueous dispersion of zirconia particles was used in the photocatalyst coating liquid. The thickness of the photocatalyst layer in the photocatalyst-coated bodies thus obtained was 0.8 μm.

Example B6

A photocatalytic coating liquid was then provided. The photocatalytic coating liquid was prepared by mixing an aqueous dispersion of anatase form of titania (average particle diameter: 40 nm), water dispersible colloidal silica (average particle diameter: 20 nm), an aqueous dispersion of zirconia particles (monoclinic crystal and average crystallite diameter 5 nm), and an aqueous solution of ammonium zirconium carbonate into water as a solvent and adjusting the solid content to 5.5% by mass. The mass ratio among the solid content of TiO$_2$, the solid content of colloidal silica, the solid content of ZrO$_2$, and the solid content of ammonium zirconium carbonate was 10:72:9:9.

Crystal forms of each component in the photocatalyst coating liquid was confirmed by the results of powder X-ray diffractometry of the product obtained by drying thereof. The number average particle diameter was determined by observing the product obtained by drying thereof under a scanning electron microscope and measuring the length of 100 randomly selected particles in a visual field at a magnification of 200,000 times.

The average crystallite diameter of an aqueous dispersion of zirconia particles was determined according to the Scherrer's equation using a diffractometry peak having the highest intensity around 2θ=28[deg.] by powder X-ray diffractometry of the product obtained by drying thereof, and LaB$_6$ as a reference material.

The photocatalytic coating liquids were coated onto a surface of a substrate, the surface being coated with an acrylic silicone, and the coating was dried at ambient temperature to obtain photocatalyst-coated bodies. The thickness of the photocatalyst layer in the photocatalyst-coated bodies thus obtained was 0.8 μm.

Comparative Example B1

A photocatalytic coating liquid was then provided. The photocatalytic coating liquid was prepared by mixing an aqueous dispersion of anatase form of titania (average particle diameter: 40 nm) and water dispersible colloidal silica (average particle diameter: 20 nm) into water as a solvent and adjusting the solid content to 5.5% by mass. The mass ratio among the solid content of $TiO_2$ and the solid content of colloidal silica was 10:90.

The photocatalytic coating liquids were coated onto a surface of a substrate, the surface being coated with an acrylic silicone, and the coating was dried at ambient temperature to obtain photocatalyst-coated bodies. The thickness of the photocatalyst layer in the photocatalyst-coated bodies thus obtained was 0.8 µm.

Comparative Example B2

A photocatalytic coating liquid was then provided. The photocatalytic coating liquid was prepared by mixing an aqueous dispersion of anatase form of titania (average particle diameter: 40 nm), water dispersible colloidal silica (average particle diameter: 20 nm), an aqueous dispersion of amorphous zirconia particles, and solution of ammonium zirconium carbonate in water into water as a solvent and adjusting the solid content to 5.5% by mass. The mass ratio among the solid content of $TiO_2$, the solid content of colloidal silica, the solid content of $ZrO_2$ and the solid content of ammonium zirconium carbonate was 10:63:9:18.

The photocatalytic coating liquids were coated onto a surface of a substrate, the surface being coated with an acrylic silicone, and the coating was dried at ambient temperature to obtain photocatalyst-coated bodies. The thickness of the photocatalyst layer in the photocatalyst-coated bodies thus obtained was 8 µm.

Example B7

A photocatalytic coating liquid was then provided. The photocatalytic coating liquid was prepared by mixing an aqueous dispersion of silica-coated anatase form of titania (the number average particle diameter: 10 nm), colloidal silica dispersed in isopropanol (the number average particle diameter: 20 nm) and an aqueous dispersion of zirconia particles ((mixed crystal comprising monoclinic crystal (an average crystallite diameter: 8.6 nm) being 59% and cubic crystal (an average crystallite diameter: 7.0 nm) being 41%)) into mixing solvent of alcohol and water (alcohol concentration more than 99% by mass) and adjusting the solid content to 1.0% by mass. the mass ratio among the solid content of TiO2, the solid content of colloidal silica and the solid content of $ZrO_2$ was 10:81:9.

Crystal forms of each component in the photocatalyst coating liquid was confirmed by the results of powder X-ray diffractometry of the product obtained by drying thereof. The number average particle diameter was determined by observing the product obtained by drying thereof under a scanning electron microscope and measuring the length of 100 randomly selected particles in a visual field at a magnification of 200,000 times.

The average crystallite diameter of an MeOH dispersion of zirconia particles was determined according to the Scherrer's equation using $LaB_6$ as a standard document, based on a diffractometry peak having the highest intensity around $2\theta=28[deg.]$ to $32[deg.]$ by powder X-ray diffractometry of the product obtained by drying thereof.

The photocatalytic coating liquids were coated onto a surface of a substrate, the surface being coated with an acrylic silicone, and then the coating was dried. This procedure was repeated ten times. The thickness of the photocatalyst layer in the photocatalyst-coated bodies thus obtained was 2.2 µm.

Example B8

A sample was prepared in the same manner as in Example B7, except that the mass ratio among the solid content of $TiO_2$, the solid content of colloidal silica and the solid content of $ZrO_2$ in the photocatalytic coating liquid was 10:72:18. The thickness of the photocatalyst layer in the photocatalyst-coated bodies thus obtained was 2.2 µm.

Example B9

A sample was prepared in the same manner as in Example B7, except that the mass ratio among the solid content of $TiO_2$, the solid content of colloidal silica and the solid content of $ZrO_2$ in the photocatalytic coating liquid was 10:45:45. The thickness of the photocatalyst layer in the photocatalyst-coated bodies thus obtained was 2.2 µm.

Example B10

A sample was prepared in the same manner as in Example B7, except that mixed crystal comprising monoclinic crystal (an average crystallite diameter: 5.6 nm) being 50% and cubic crystal (an average crystallite diameter: 4.8 nm) being 50% as methanol dispersion of zirconia particles in a photocatalyst coating liquid was used. The thickness of the photocatalyst layer in the photocatalyst-coated bodies thus obtained was 2.2 µm.

Example B11

A sample was prepared in the same manner as in Example B8, except that mixed crystal comprising monoclinic crystal (an average crystallite diameter: 5.6 nm) being 50% and cubic crystal (an average crystallite diameter: 4.8 nm) being 50% as methanol dispersion of zirconia particles in a photocatalyst coating liquid was used. The thickness of the photocatalyst layer in the photocatalyst-coated bodies thus obtained was 2.2 µm.

Example B12

A sample was prepared in the same manner as in Example B9, except that mixed crystal comprising monoclinic crystal (an average crystallite diameter: 5.6 nm) being 50% and cubic crystal (an average crystallite diameter: 4.8 nm) being 50% as methanol dispersion of zirconia particles in a photocatalyst coating liquid was used. The thickness of the photocatalyst layer in the photocatalyst-coated bodies thus obtained was 2.2 µm.

Example B13

A sample was prepared in the same manner as in Example B7, except that monoclinic crystal (an average crystallite diameter: 6.3 nm) as methanol dispersion of zirconia particles in a photocatalyst coating liquid was used. The thickness of the photocatalyst layer in the photocatalyst-coated bodies thus obtained was 2.2 µm.

Example B14

A sample was prepared in the same manner as in Example B8, except that monoclinic crystal (an average crystallite diameter: 6.3 nm) was used. The thickness of the photocatalyst layer in the photocatalyst-coated bodies thus obtained was 2.2 μm.

Comparative Example B3

A photocatalytic coating liquid was then provided. The photocatalytic coating liquid was prepared by mixing an aqueous dispersion of silica-coated anatase form of titania (the number average particle diameter: 10 nm) and colloidal silica dispersed in isopropanol (the number average particle diameter: 20 nm) into mixing solvent of alcohol and water (alcohol concentration more than 99% by mass) and adjusting the solid content to 1.0% by mass. The mass ratio among the solid content of TiO2, the solid content of colloidal silica and the solid content of $ZrO_2$ was 10:90.

Crystal forms of each component in the photocatalyst coating liquid was confirmed by the results of powder X-ray diffractometry of the product obtained by drying thereof. The number average particle diameter was determined by observing the product obtained by drying thereof under a scanning electron microscope and measuring the length of 100 randomly selected particles in a visual field at a magnification of 200,000 times.

The photocatalytic coating liquids were coated onto a surface of a substrate, the surface being coated with an acrylic silicone, and the coating was dried at room temperature to obtain photocatalyst-coated bodies. This procedure was repeated ten times. The thickness of the photocatalyst layer in the photocatalyst-coated bodies thus obtained was 2.2 μm.

Evaluation Test B1: $NO_x$ Removing Test

An $NO_x$ removing test was carried out as follows. At the outset, the samples were pretreated by exposure to BLB light at 1 mW/cm$^2$ for not less than 5 hr. The samples were then immersed in distilled water for 2 hr and were then dried at 50 for not less than 30 min. Thereafter, an $NO_x$ removing test was carried out by a method described in JIS R 1701-1, and the amount of $NO_x$ removed ($\Delta NO_x$) (μmol) was calculated.

The relative production rate R of $NO_2$ as an intermediate product was calculated by the following equation.

$R(\%)=[NO_2(\text{at the time of irradiation})-NO_2(\text{after irradiation})]/[NO(\text{after irradiation})-NO (\text{at the time of irradiation})]$ The results were as shown in Table 6 and Table 7.

TABLE 6

|  | NOx decomposed (ΔNOx) | relative production rate of NO$_2$ (R) |
| --- | --- | --- |
| Example B1 | 2.38 | 44.4 |
| Example B2 | 3.14 | 50.8 |
| Example B3 | 2.44 | 52.6 |
| Example B4 | 1.87 | 55.9 |
| Example B5 | 3.15 | 49.4 |
| Example B6 | 2.66 | 51.2 |
| Comparative Example B1 | 1.69 | 60.6 |
| Comparative Example B2 | 0.67 | 36.8 |

TABLE 7

|  | NOx decomposed (ΔNOx) | relative production rate of NO$_2$ (R) |
| --- | --- | --- |
| Example B7 | 2.91 | 52.6 |
| Example B8 | 3.42 | 56.3 |
| Example B9 | 2.84 | 54.8 |
| Example B10 | 3.50 | 57.0 |
| Example B11 | 3.55 | 58.0 |
| Example B12 | 3.35 | 53.4 |
| Example B13 | 3.48 | 57.4 |
| Example B14 | 3.22 | 59.2 |
| Comparative Example B3 | 2.62 | 60.4 |

The invention claimed is:

1. A photocatalyst-coated body comprising a substrate and a photocatalyst layer provided on the substrate,
   the photocatalyst layer comprising:
   photocatalyst particles being not less than 1 parts by mass and not more than 20 parts by mass,
   silica particles being not less than 30 parts by mass and not more than 98 parts by mass, and
   zirconia particles being not less than 1 parts by mass and not more than 50 parts by mass,
   wherein the total content of the photocatalyst particles, the silica particles and the zirconia particles is 100 parts by mass,
   wherein the zirconia particles are at least one kind of particles selected from the group consisting of crystalline zirconia particles that have an average crystallite diameter of 10 nm or less and amorphous zirconia particles,
   wherein the number average particle diameter of the zirconia particles as determined by measuring the length of 100 randomly selected particles in a visual field at a magnification of 200,000 times under a scanning electron microscope is more than 5 nm and not more than 50 nm.

2. The photocatalyst-coated body according to claim 1, wherein the content of the particulate components in the photocatalyst layer is not less than 85% by mass and not more than 100% by mass.

3. The photocatalyst-coated body according to claim 1, the zirconia particles are amorphous zirconia particles.

4. The photocatalyst-coated body according to claim 1, wherein the zirconia particles are monoclinic zirconia particles.

5. The photocatalyst-coated body according to claim 1, wherein the content of the zirconia particles is not less than 5% by mass and less than 50% by mass.

6. The photocatalyst-coated body according to claim 1, wherein the content of the photocatalyst particles is not less than 1% by mass and not more than 15% by mass.

7. The photocatalyst-coated body according to claim 1, wherein the content of the silica particles is more than 35% by mass and not more than 98% by mass.

8. The photocatalyst-coated body according to claim 1, wherein the content of the silica particles is more than 30% by mass and not more than 94% by mass.

9. The photocatalyst-coated body according to claim 1, wherein the surface of the substrate comprises organic materials and the photocatalyst layer is provided thereon.

10. The photocatalyst-coated body according to claim 1, wherein the photocatalyst particles are titanium oxide particles.

11. The photocatalyst-coated body according to claim 1, wherein the number average particle diameter of the zirconia particles as determined by measuring the length of 100 randomly selected particles in a visual field at a magnification of 200,000 times under a scanning electron microscope is more than 10 nm and not more than 50 nm.

12. The photocatalyst-coated body according to claim 1, wherein the number average particle diameter of the photocatalyst particles as determined by measuring the length of 100 randomly selected particles in a visual field at a magnification of 200,000 times under a scanning electron microscope is more than 10 nm and not more than 50 nm.

13. The photocatalyst-coated body according to claim 1, wherein the number average particle diameter of the silica particles as determined by measuring the length of 100 randomly selected particles in a visual field at a magnification of 200,000 times under a scanning electron microscope is more than 5 nm and not more than 50 nm.

14. The photocatalyst-coated body according to claim 1, wherein the thickness of the photocatalyst layer is 3 μm or less.

15. A photocatalyst coating liquid comprising:
photocatalyst particles not less than 1 parts by mass and not more than 20 parts by mass,
silica particles not less than 30 parts by mass and not more than 98 parts by mass, and
zirconia particles not less than 1 parts by mass and not more than 50 parts by mass,
wherein the total content of the photocatalyst particles, the silica particles, and the zirconia particles is 100 parts by dry mass,
wherein the photocatalyst coating liquid further comprises water and/or alcohol,
wherein the zirconia particles are at least one kind of particles selected from the group consisting of crystalline zirconia particles that have an average crystallite diameter of 10 nm or less and amorphous zirconia particles,
wherein the number average particle diameter of the zirconia particles as determined by measuring the length of 100 randomly selected particles in a visual field at a magnification of 200,000 times under a scanning electron microscope is more than 5 nm and not more than 50 nm.

16. The photocatalyst coating liquid according to claim 15, wherein the zirconia particles are amorphous zirconia particles.

17. The photocatalyst coating liquid according to claim 15, wherein the zirconia particles are monoclinic zirconia particles.

18. The photocatalyst coating liquid according to claim 15, wherein the content of the zirconia particles is not less than 5% by mass and less than 50% by mass.

19. The photocatalyst coating liquid according to claim 15, wherein the content of the photocatalyst particles is not less than 1% by mass and not more than 15% by mass.

20. The photocatalyst coating liquid according to claim 15, wherein the content of the silica particles is more than 35% by mass and not more than 98% by mass.

21. The photocatalyst coating liquid according to claim 15, wherein the content of the silica particles is more than 30% by mass and note more than 94% by mass.

22. The photocatalyst coating liquid according to claim 15, applied to a substrate, the surface of which comprises organic materials.

23. The photocatalyst coating liquid according to claim 15, wherein the photocatalyst particles are titanium oxide particles.

24. The photocatalyst coating liquid according to claim 15, wherein the number average particle diameter of the zirconia particles as determined by measuring the length of 100 randomly selected particles in a visual field at a magnification of 200,000 times under a scanning electron microscope is more than 10 nm and not more than 50 nm.

25. The photocatalyst coating liquid according to claim 15, wherein the number average particle diameter of the photocatalyst particles as determined by measuring the length of 100 randomly selected particles in a visual field at a magnification of 200,000 times under a scanning electron microscope is more than 10 nm and not more than 50 nm.

26. The photocatalyst coating liquid according to claim 15, wherein the number average particle diameter of the silica particles as determined by measuring the length of 100 randomly selected particles in a visual field at a magnification of 200,000 times under a scanning electron microscope is more than 5 nm and not more than 50 nm.

27. A method for removing $NO_x$ in ambient air, the method comprising bringing a photocatalyst-coated body according to claim 1 and ambient air including $NO_x$ into contact with each other.

\* \* \* \* \*